(12) United States Patent
Bowles et al.

(10) Patent No.: US 9,148,775 B2
(45) Date of Patent: Sep. 29, 2015

(54) MULTIVARIANT MOBILE OPERATING SYSTEM CONFIGURATION

(71) Applicant: Microsoft Corporation, Redmond, WA (US)

(72) Inventors: Sean Bowles, Bellevue, WA (US); Jeewan Ghuman, Seattle, WA (US); John Spaith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 14/040,235

(22) Filed: Sep. 27, 2013

(65) Prior Publication Data

US 2015/0094050 A1    Apr. 2, 2015

(51) Int. Cl.
  *H04W 8/02* (2009.01)
  *G06F 9/445* (2006.01)
  *H04W 8/26* (2009.01)

(52) U.S. Cl.
  CPC .............. *H04W 8/02* (2013.01); *G06F 9/44505* (2013.01); *H04W 8/265* (2013.01)

(58) Field of Classification Search
  CPC ........ H04W 48/18; H04W 60/00; H04W 8/18
  USPC ........................................................ 455/418
  See application file for complete search history.

(56) References Cited

U.S. PATENT DOCUMENTS

| | | | |
|---|---|---|---|
| 6,492,995 B1 | 12/2002 | Atkin et al. | |
| 7,444,621 B2 | 10/2008 | Pletcher et al. | |
| 8,725,846 B2 * | 5/2014 | Yamazaki | 709/220 |
| 2004/0088155 A1 | 5/2004 | Kerr et al. | |
| 2004/0253975 A1 | 12/2004 | Shiraogawa et al. | |
| 2007/0135112 A1 * | 6/2007 | Lessing | 455/418 |
| 2011/0195700 A1 * | 8/2011 | Kukuchka et al. | 455/422.1 |
| 2012/0109998 A1 | 5/2012 | Patch et al. | |
| 2014/0080467 A1 * | 3/2014 | Urbanek | 455/418 |

FOREIGN PATENT DOCUMENTS

EP    2079256 A1    7/2009

OTHER PUBLICATIONS

Microsoft, "OS Localization (Windows Embedded CE 6.0)", Published on: Jan. 6, 2010, Available at: http://msdn.microsoft.com/en-us/library/ee491137(v=winembedded.60).aspx, 2 pages.

Android, "Localizing with Resources," Published on: Oct. 7, 2009, Available at: http://developer.android.com/guide/topics/resources/localization.html, 6 pages.

Internationalization and Localization—Apple Developer, "Build Apps for the World," Published on: Dec. 28, 2011, Available at: https://developer.apple.com/internationalization/, 3 pages.

(Continued)

*Primary Examiner* — Qun Shen
(74) *Attorney, Agent, or Firm* — Timothy Churna; Kate Drakos; Micky Minhas (57) ABSTRACT

Techniques are described for configuring a multivariant mobile operating system. The current state of a mobile computing device can be determined by determining keys to use for obtaining configuration settings. The determined keys can be used to retrieve configuration settings. The configuration settings can be prioritized. The prioritized configuration settings can be applied to configure the multivariant mobile operating system.

17 Claims, 8 Drawing Sheets

(56) References Cited

OTHER PUBLICATIONS

Apple Inc., "Internationalization Programming Topics," Published on: Jan. 9, 2012, Available at: https://developer.apple.com/library/mac/documentation/MacOSX/Conceptual/BPInternational/BPInternational.pdf, 45 pages.

"International Search Report and Written Opinion Received for PCT Patent Application No. PCT/US2014/056857", Mailed Date: Nov. 19, 2014, 8 pages. (MS# 339761.02).

* cited by examiner

SOFTWARE 680 IMPLEMENTING DESCRIBED TECHNOLOGIES

MULTIVARIANT MOBILE OPERATING SYSTEM CONFIGURATION

BACKGROUND

Manufacturers of mobile phones, and other computing devices with cellular connectivity, increasingly provide such devices for use by different mobile operators in different markets. For example, a large mobile phone manufacturer may sell mobile phones to different mobile phone operators in the U.S., to different mobile phone operators in Europe, and to different mobile phone operators in other markets throughout the world.

In order to work with a particular mobile phone operator and in a particular market or country, a mobile phone needs to be configured with settings specific to the operator, and possibly to the particular market, country, etc. For example, cellular data settings may need to be configured in addition to other settings, such as country-specific settings, application settings, etc.

In order for the manufacturer to provide the mobile phone, and associated operating system software, for each specific combination of mobile operator, country, etc., that needs different settings, the manufacturer may need to create a separate version of the operating system software configured with the settings for the specific combination. For example, a manufacturer may have to create many different "images" (e.g., hundreds or more) of the operating system software, each configured to support a different combination of mobile operator, country, etc.

Providing many different version, or images, of the operating system software can be problematic and inefficient. For example, the manufacturer may spend a lot of time setting up and maintaining each version. In addition, if a change to a particular setting is needed, it can require updating many different versions of the operating system software.

Therefore, there exists ample opportunity for improvement in technologies related to configuring a mobile operating system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for providing a dynamically configurable multivariant mobile operating system. For example, the current state of a computing device (e.g., a mobile computing device, such as a mobile phone or a tablet with a cellular data capability) can be determined. Determining the current state of the computing device can be accomplished, for example, by determining keys to use for obtaining configuration settings (e.g., keys indicating available Universal Integrated Circuit Card (UICC) configuration parameters and/or keys indicating available configuration parameters from hardware/software of the device or from other sources such as external sources). Once the keys have been determined, they can be used to retrieve configuration settings (e.g., from a settings data store located on the mobile computing device). The configuration settings can then be prioritized (e.g., ordered from least specific settings to most specific settings or consolidated to remove lower priority settings for any overlapping settings). The prioritized configuration settings can then be applied to the multivariant mobile operating system running on the mobile computing device. The multivariant mobile operating system can be configured, for example, when specific events are detected, such as when a new UICC card is detected and/or when the device boots from a powered-off state.

For example, a method can be provided for dynamic application of variant settings to a multivariant mobile operating system running on a mobile computing device (e.g., a mobile phone or other mobile device with cellular connectivity). The method comprises determining a plurality of keys (e.g., UICC keys and/or extension keys), retrieving (e.g., from a settings data store) a set of configuration settings and corresponding values based on the plurality of keys, dynamically creating a configuration variant by prioritizing the retrieved set of configuration settings, and applying the set of configuration settings to the multivariant mobile operating system according to the prioritization.

As another example, a method can be provided for dynamic application of variant settings to a multivariant mobile operating system running on a mobile computing device (e.g., a mobile phone or other mobile device with cellular connectivity). The method comprises determining a plurality of keys that indicate, at least in part, configuration parameters for the mobile computing device, retrieving (e.g., from a settings data store) a set of configuration settings and corresponding values based on the plurality of keys, dynamically creating a configuration variant by prioritizing the retrieved set of configuration settings, where prioritizing the retrieved set of configuration settings comprises ordering the set of configuration settings from lowest priority to highest priority, and applying the set of configuration settings to the multivariant mobile operating system in order from lowest priority to highest priority.

As another example, a mobile computing device comprising a processing unit, memory, and a UICC can be provided for performing operations described herein. For example, a runtime engine running on the mobile computing device can determine keys to use for obtaining configuration settings (e.g., keys indicating available UICC configuration parameters and/or keys indicating available configuration parameters from hardware/software of the device or from other sources), retrieve configuration settings using the keys from a settings data store stored on the mobile computing device, prioritize the settings, and apply the settings to the mobile computing device based on the prioritization.

As described herein, a variety of other features and advantages can be incorporated into the technologies as desired.

DETAILED DESCRIPTION

Example 1

Overview

As described herein, various techniques and solutions can be applied for providing a dynamically configurable multivariant mobile operating system. For example, the current state of a mobile computing device (e.g., a mobile phone or a tablet with cellular data capability) can be determined. Determining the current state of the computing device can be accomplished, for example, by determining keys to use for obtaining configuration settings (e.g., keys indicating available Universal Integrated Circuit Card (UICC) configuration parameters and/or keys indicating available configuration parameters from hardware/software of the device or from other sources). Once the keys have been determined, they can be used to retrieve configuration settings (e.g., from a settings data store located on the mobile computing device). The configuration settings can then be prioritized (e.g., ordered from least specific settings to most specific settings). The prioritized configuration settings can then be applied to the multivariant mobile operating system running on the mobile computing device. The techniques and solutions described herein can also be applied for providing a dynamically configurable multivariant operating system running on a computing device that is not typically mobile (e.g., a desktop computer).

Example 2

Multivariant Mobile Operating System

In the technologies described herein, a multivariant mobile operating system refers to an operating system of a mobile computing device (e.g., a mobile phone) that can be dynamically configured to support multiple configurations (e.g., multiple variants). For example, a multivariant mobile operating system can be dynamically configured to support different mobile phone operators in different markets (e.g., in different countries).

Using the technologies described herein, a multivariant mobile operating system can be provided as a single image, while being dynamically configurable to support many different mobile markets (e.g., many different mobile operators in many different countries with many different configurations). For example, a multivariant operating system can be used by a mobile phone OEM (original equipment manufacturer). The mobile phone OEM can create a settings data store containing settings supporting the different markets into which the mobile phone will be sold. For example, the settings data store can contain settings supporting different mobile phone operators (e.g., network connectivity settings, messaging settings, etc.), different regions (e.g., country-specific and/or language-specific settings), and/or different hardware or software configurations of the device (e.g., a specific case color, custom phone branding packages purchased by a user, etc.). The OEM can then provide mobile phones with the multivariant mobile operating system and the configuration settings (e.g., in a settings data store stored on the mobile phone). In this way, the OEM would only have to provide one version of the phone software while still supporting the different configuration needs of its mobile operator and/or end user customers.

When the mobile phone is used (e.g., when a new UICC is inserted, when a cold boot is performed, and/or at other times), the multivariant mobile operating system running on the mobile phone can be automatically configured. For example, aspects of the phone can be detected (e.g., keys, such as keys stored on the UICC and/or keys from other sources) and configuration settings can be obtained from the settings data store (e.g., by matching the detected keys). The configuration settings can be prioritized (e.g., ordered from lowest priority to highest priority and/or from least specific to most specific). The settings can then be applied (e.g., in prioritized order). The specific set of configuration settings to be applied to the mobile phone can be called a "variant." Furthermore, the multivariant mobile operating system can be configured with a different variant as needed (e.g., when configuration parameters change, such as when a new UICC is detected).

Example 3

Keys

In the technologies described herein, the state or configuration of a mobile computing device, such as a mobile phone, can be determined. For example, the state of the device can be determined based on various keys that reflect the configuration of the computing device. For example, determining the device state can include inspecting the device to determine which keys are available (e.g., which types of configuration information are available in the UICC and/or available from other sources).

Keys can include configuration information that is available from a UICC of a mobile computing device with cellular capability. Such keys can include: MCC (mobile country code), MNC (mobile network code), SPN (service provider name), language preference information, MSIN (mobile subscriber identification number), and/or other types of information that is stored on the UICC. In some circumstances, there may be keys that are not available on the UICC (e.g., some mobile operators may not provide an SPN). Keys that are used to obtain settings from the UICC can be called UICC keys. A UICC is a smart card conforming to the European Telecommunications Standards Institute (ETSI) technical report (TR) 102 216 standard. The MCC and MNC parameters are defined in Telecommunication Standardization Sector (ITU-T) Recommendation E.212.

Keys can also include configuration information that is not obtained from a UICC of a mobile computing device. Keys that are obtained from sources other than the UICC can be called extension keys. One example of extension keys are keys that are obtained from a non-UICC source on the computing device (e.g., from the firmware, from software, etc.). Such extension keys can indicate, for example, hardware and/or software configuration information. Hardware and/or software configuration information can include: a key indicating the color of a mobile phone (e.g., the metal and/or plastic color of the phone's exterior), a key that indicates a particular model or version of the device, a key that indicates installed software apps, etc.

Another example of extension keys are keys that are obtained from sources outside the mobile computing device (e.g., obtained from a mobile phone operator, app store, etc.). Such keys can include: keys that indicate user account information (e.g., configuration preferences), keys that indicate purchased software or services (e.g., purchased apps), etc.

In some implementations, only UICC keys are used to obtain configuration parameters for configuring a multivariant mobile operating system. In other implementations, a combination of UICC keys and extension keys are used to obtain configuration parameters for configuring a multivariant mobile operating system.

In some implementations, only extension keys are used. For example, keys indicating cellular network configuration information can be obtained from a source other than a UICC (e.g., from another type of removable configuration module, from settings stored on the computing device, and/or from another internal and/or external source). Such cellular network configuration information can be obtained using a key indicating a country, a key indicating a mobile network, a key indicating a service provider name, and/or other keys that can be used to configure the computing device to access a cellular network or another type of communication network.

Example 4

Configuration Settings

In the technologies described herein, configuration settings can be used to configure a multivariant mobile operating system. Configuration settings can be obtained using keys. For example, configuration settings can be stored in a settings data store. Keys can be used to retrieve settings from the settings data store (e.g., by matching entries in the settings data store for one or more keys).

Configuration settings can be applied to a multivariant mobile operating system to configure the operating system. For example, the configuration settings can be applied to configure the operating system to use a particular mobile phone operator (e.g., by configuring cellular data connectivity settings, messaging settings, account settings, etc.). The configuration settings can also be applied to configure other aspects of the operating system (e.g., user interface features, such as wallpaper, colors, user interface theme, app settings, app installation, etc.).

Example settings include: wallpaper, user interface theme (e.g., colors, fonts, images, etc.), volume notification, mobile operator-specific settings (e.g., network settings), messaging settings (e.g., SMS, MMS), voice mail configuration, emergency phone number, country-specific settings, default language settings, regulatory settings (e.g., power settings), enabled hardware and/or software features, and pre-installed apps.

Example 5

Determining Device State

In the technologies described herein, the state or configuration of a mobile computing device, such as a mobile phone, can be determined. For example, the state of the device can be determined based on various keys that reflect the configuration parameters of the mobile computing device. For example, determining the device state can include inspecting the device to determine which keys are available (e.g., which types of configuration parameters are available in the UICC and/or available from other internal or external sources).

For example, determining the state of the mobile computing device can be performed by determining which keys are available to use for configuring the multivariant mobile operating system running on the device. For example, the UICC of the device can be examined for available keys and the configuration parameters for the available keys can be retrieved. In a specific implementation, the UICC is examined for at least the MCC, MNC, SPN, and language preference. The available keys can then be used to obtain configuration settings (e.g., from the settings data store). For example, if the UICC is examined and values for the MCC and MNC keys are available, but the SPN key is empty, then the MCC and MNC keys can be used to obtain configuration settings. If, however, a value for the SPN key is present as well, then the SPN key can also be used when obtaining configuration settings.

Example 6

Configuring Multivariant Mobile Operating Systems

In the technologies described herein, settings can be obtained and applied to configure a multivariant operating system (e.g., a multivariant mobile operating system). For example, a set of settings can be obtained that defines a variant of the multivariant operating system. The settings can then be applied (e.g., in a specific order) to configure the multivariant operating system.

Figure 1:
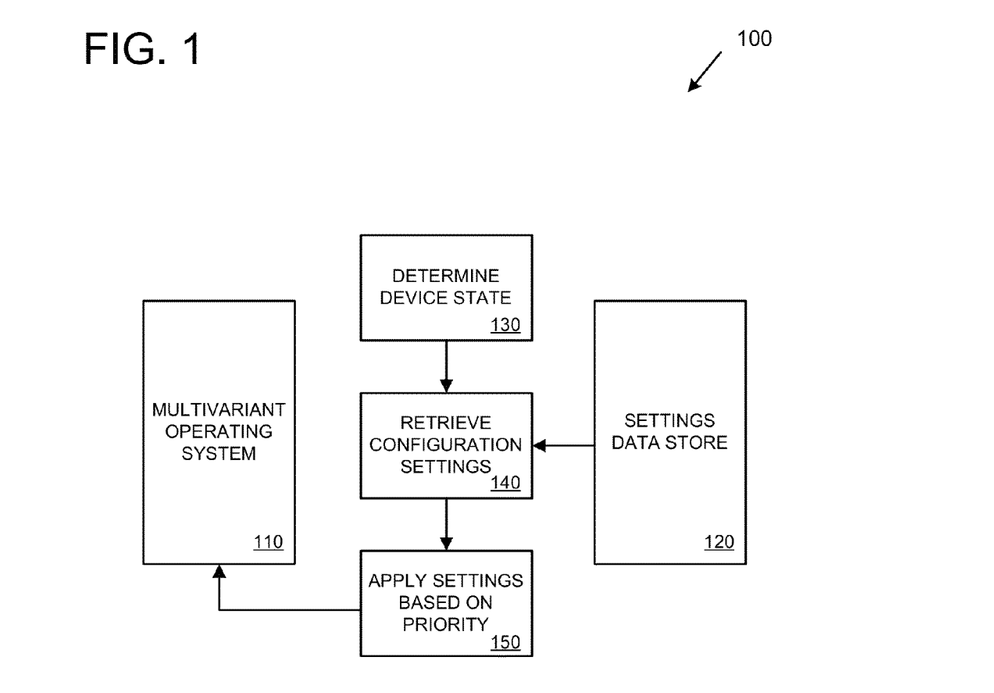
FIG. 1 is a diagram depicting an example of applying settings to configure a multivariant operating system.

FIG. 1 depicts an example 100 of applying settings to configure a multivariant operating system (e.g., a multivariant mobile operating system). In the example 100, a multivariant operating system 110 is provided. For example, the multivariant operating system 110 can be a multivariant mobile operating system installed on a mobile computing device, such as a mobile phone. Alternatively, the multivariant operating system 110 can be installed on a computing device that is typically not mobile, such as a desktop computer.

Also provided in the example 100 is a settings data store 120. The settings data store 120 stores settings that can be used to configure different variants of the multivariant operating system 110. For example, the settings data store 120 can store configuration settings to configure the multivariant operating system 110 for different combinations of mobile phone operator, country, region, language, installed apps, etc.

As depicted at 130, configuring the multivariant operating system 110 can be performed by determining the state of a computing device. For example, the state of the computing device can be determined based on various keys that indicate configuration parameters of the computing device. Some examples of keys include keys obtained from a UICC of the computing device (e.g., mobile country code, mobile network code, etc.), keys obtained from hardware and/or software information (e.g., case color, optional hardware components, installed applications, etc.), and/or keys obtained from external sources (e.g., user account details, purchased software or services, etc.).

As depicted at 140, once the state of the computing device has been determined, configuration settings can be obtained from the settings data store 120. For example, the configuration settings can be retrieved by matching the keys with data stored in the settings data store 120 (e.g., with entries in one or more databases, files, and/or other types of data storage repositories).

As depicted at 150 the retrieved configuration settings are applied based on priority of the configuration settings. For example, prioritization of the settings can be based upon priority information associated with keys, priority information associated with individual settings, the number of keys that match a particular setting, and/or other priority information. The priority information can include indications of which keys and/or settings are less specific and which are more specific.

In some implementations, applying the configuration settings based on priority (e.g., as depicted at 150) comprises consolidating the retrieved set of configuration settings to remove lower priority settings that would be overwritten by higher priority settings, or in other words, to retain the highest priority setting for any overlapping settings. For example, if a lower priority wallpaper settings is present along with a higher priority wallpaper setting, then the lower priority wallpaper setting can be removed and just the higher priority wallpaper setting can be applied (e.g., just the higher priority wallpaper setting can be included in the configuration variant that is applied to configure the multivariant operating system).

In other implementations, applying configuration settings based on priority (e.g., as depicted at 150) comprises applying the configuration settings in order from lowest priority to highest priority. In this way, any lower priority settings are applied first and then overwritten if a higher priority setting is present.

Figure 2:
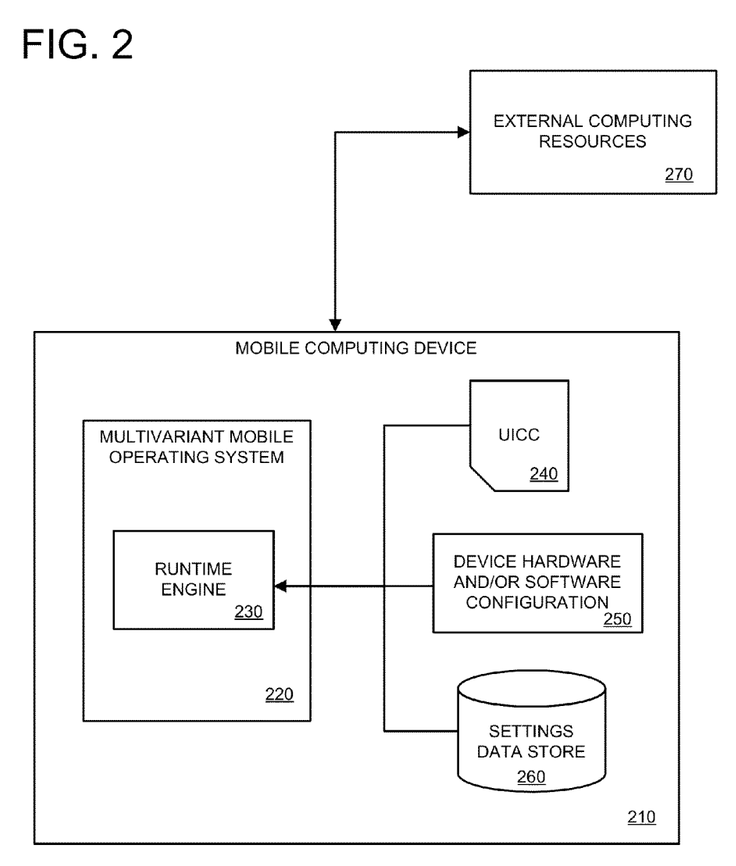
FIG. 2 is a diagram depicting an example mobile computing device running a multivariant operating system.

FIG. 2 depicts an example mobile computing device 210 running a multivariant mobile operating system 220. The mobile computing device 210 also comprises a settings data store 260 and a UICC 240.

The multivariant mobile operating system 220 comprises a runtime engine 230 for performing operations to configure the multivariant mobile operating system 220. Alternatively, the runtime engine 230 can be run as a separate component of the mobile computing device 210 (e.g., a separate software component).

The runtime engine 230 can determine keys indicating configuration parameters of the mobile computing device 210. For example, the runtime engine 230 can obtain keys, and their associated configuration parameters, from the UICC 240, from hardware and/or software configuration of the mobile computing device 250 (e.g., indicating hardware options such as case color, installed applications, optional hardware or software features, etc.), and/or from external computing resources 270 (e.g., from an app store, from mobile operator servers, etc.).

The runtime engine 230 can use the keys to retrieve configuration settings from the settings data store 260. For example, the runtime engine can match keys against entries stored (e.g., stored in XML data files) in the settings data store 260.

The runtime engine 230 can prioritize the retrieved configuration information. For example, the runtime engine 230 can order the configuration settings from lowest priority (e.g., lease specific) to highest priority (e.g., most specific). The runtime engine 230 can consolidate the retrieved configuration settings (e.g., to retain just the highest priority setting for any overlapping settings). The prioritization can be performed, for example, based on priority information associated with the configuration settings retrieved from the settings data store 260, based on priority information associated with the keys, based on the number of keys that match a particular configuration setting, and/or based on other information.

The runtime engine 230 can apply the configuration settings (e.g., in prioritized order) to the multivariant mobile operating system 220. The runtime engine 230 can apply configuration settings at specific times (e.g., upon detection of specific events). For example, configuration of the operating system can be performed when a new UICC is installed (e.g., the first time the device powers on with a UICC and/or when a UICC is changed). In some implementations, some configuration settings are applied only once (e.g., the wallpaper setting may be applied only once, such as when the device boots for the first time). In some implementations, some configuration settings are applied only when the device boots for the first time or boots for the first time after the device has been reset to factory settings (these situations can be called a cold boot). Other configuration settings may be checked and applied (e.g., if they have changed) multiple times. For example, each time the mobile computing device boots (e.g., a boot from a powered-off state), keys can be checked to see if configuration parameters of the device have changed (e.g., if the UICC has been changed and/or if internal or external keys have changed), and if so then new configuration settings can be retrieved, prioritized, and applied.

Example 7

Settings Data Store

In the technologies described herein, a Settings data store can be stored on a mobile computing device and used to configure a multivariant mobile operating system running on the mobile computing device.

Figure 3:
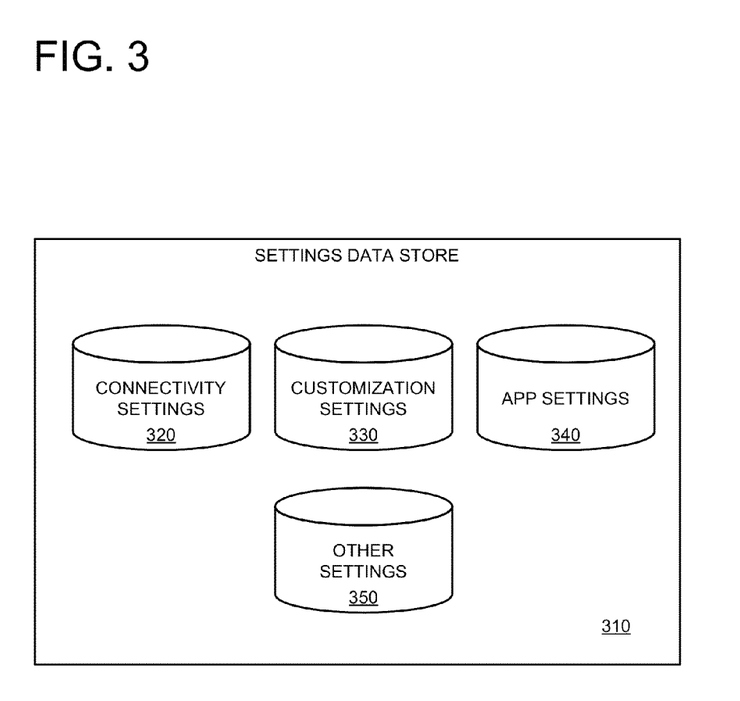
FIG. 3 is a diagram of an example settings data store.

FIG. 3 a diagram of an example settings data store 310, including the types of settings that can be stored in the settings data store 310. As depicted, the example settings data store 310 stores a connectivity settings 320 repository, a customization settings 330 repository, an app (application) settings 340 repository, and/or a repository for other settings 350. The different types of settings can be stored separately (e.g., in separate data repositories, as depicted) or combined (e.g., in a common data file or database). For example, the connectivity settings 320 repository can be stored as a first set of one or more XML data files, the customization settings 330 repository can be stored as a second set of one or more XML data files, and so on.

The connectivity settings 320 repository stores settings related to wireless connectivity of the mobile computing device. For example, the connectivity settings can include settings related to cellular data, Multimedia Messaging Service (MMS) configuration, and/or other connectivity-related settings.

The customization settings 330 repository stores settings related to customization of the mobile computing device. For example, customization settings can include ring tones, wallpapers, themes, graphical user interface (GUI) options, etc.

The app settings 340 repository stores settings related to apps of the mobile computing device. For example, app settings can include settings that configure operation of installed apps, settings that indicate which apps to download and install (e.g., apps to install for specific mobile operators and/or apps to install based on customer purchase), etc. Repositories for other settings 350 can also be provided.

The settings stored in the settings data store (e.g., stored in settings data store 310) can be accessed using keys. For example, entries for settings in the settings data store can be matched against one or more keys (e.g., entries can be identified by individual keys or by groups of keys). Table 1 below depicts a simplified example of connectivity settings (e.g., connectivity settings that could be stored in the connectivity settings 320 repository).

TABLE 1

| Entry | Keys | Settings |
|---|---|---|
| 1 | MCC = 310 or 311 | Emergency = 911;<br>Wallpaper = US_flag.jpg |
| 2 | MCC = 234 or 235 | Emergency = 112;<br>Wallpaper = UK_flag.jpg |

TABLE 1-continued

| Entry | Keys | Settings |
|---|---|---|
| 3 | MCC = 208 | Emergency = 112;<br>Wallpaper = France_flag.jpg |
| 4 | MCC = 310 and<br>MNC = 150 | (Cellular data connectivity settings for AT&T);<br>Wallpaper = att.jpg |
| 5 | MCC = 310 and<br>MNC = 260 | (Cellular data connectivity settings for T-Mobile) |
| 6 | MCC = 310 and<br>MNC = 016 and<br>SPN = "Cricket" | (Cellular data connectivity settings for Cricket Wireless) |
| 7 | MCC = 310 and<br>MNC = 150 and<br>SPN = "Consumer Cellular" | (Cellular data connectivity settings for Consumer Cellular);<br>Wallpaper = consumer_cellular.jpg |

With reference to Table 1, consider a first example where a mobile phone is sold to a U.S. consumer using the AT&T cellular network. In this example, when the mobile phone is turned on, MCC and MNC keys are determined to be available from the UICC installed in the phone. In this example, the value for the MCC is 310 and the value for the MNC is 150. Using these keys, configuration settings can be retrieved from the settings data store on the phone. In this example, and using Table 1, the matching entries would be entry 1 (matching just the MCC of 310) and entry 4 (matching both the MCC of 310 and the MNC of 150). From the matching entries, the configuration settings would be retrieved (the emergency number and wallpaper configuration settings, and corresponding values, from entry 1 and the cellular data connectivity settings and wallpaper settings, and corresponding values, from entry 4). The retrieved configuration settings could then be prioritized. In this example, the settings from entry 1 would be a lower priority due to the match of only one key (the MCC key) while the settings from entry 4 would be higher priority (and more specific) due to the match of two keys. Therefore, in applying the settings, the settings from entry 1 would be applied first (the less specific settings) to set the emergency phone number and to set the wallpaper graphic to a U.S. flag image. Then, the settings from entry 4 would be applied (the more specific settings) to set the cellular data connectivity settings to use AT&T's cellular network and to set the wallpaper graphic to an AT&T logo (thus overwriting the less specific setting for the U.S. flag image). Alternatively, the highest priority settings can be determined and then applied. Using this approach, the emergency phone number from entry 1 would be retained as would the cellular data connectivity and wallpaper settings from entry 4 (the wallpaper setting from entry 1 would not be retained as it is lower priority than the overlapping wallpaper setting from entry 4).

With reference to Table 1, consider a second example where a mobile phone is sold to a U.S. consumer using Consumer Cellular (which is a reseller, or mobile virtual network operator (MVNO), using AT&T's network). In this example, when the mobile phone is turned on, MCC, MNC, and SPN keys are determined to be available from the UICC installed in the phone. In this example, the value for the MCC is 310, the value for the MNC is 150, and the value for the SPN is "Consumer Cellular." This example would operate like the first example above, with an additional matching entry, entry 7, in Table 1. The retrieved configuration settings would be applied as with the first example, with the addition of the settings in entry 7 being applied last because they are the highest priority settings due to the matching of three keys. Therefore, in this example, the cellular data connectivity settings that were applied from entry 4 would be updated by the cellular data connectivity settings in entry 7 as would the wallpaper image. However, because Consumer Cellular uses AT&T's network, the cellular data connectivity settings in entry 7 would only need to contain those values that are different from the connectivity values in entry 4 (e.g., depending on the situation, no values, or only a small number of values, may need to be included in entry 7). Alternatively, the highest priority settings can be determined first and then applied.

As illustrated by the examples above, configuration settings can be prioritized and applied to a multivariant mobile operating system in a specific order (e.g., from least specific to most specific and/or based on other types of prioritization). In some implementations, settings from different data repositories within the settings data store can be prioritized (e.g., configuration settings from the connectivity settings repository can be applied before configuration settings from the customization settings repository, which can be applied before settings from the app settings repository, and so on). In some implementations, configuration settings obtained using UICC keys can be applied before settings obtained using extension keys. In some implementations, specific keys can be independently prioritized and/or prioritized as a group. For example, MCC and MNC keys can be given a higher priority than a key indicating case color, and thus the configuration settings obtained based on the MCC and/or MNC keys can be applied after configuration settings obtained based on the case color key.

Also, as illustrated by Table 1 settings can be organized and applied efficiently. For example, a number of general settings (less specific settings) can be created (e.g., by an OEM) for a country, region, or market (e.g., emergency phone number settings, default user interface settings, and/or other general settings that are likely to be used by many different operators). The general settings can be matched, for example, by the MCC key (e.g., MCC key values of 310 and 311 would indicate settings to be applied to mobile device provided for the U.S. market). More specific settings can then be provided to supplement, or override, the general settings. For example, for a phone sold to the U.S. market, the general settings can first be applied based on the MCC value. Then, more specific settings can be applied. For example, more specific carrier-specific settings can then be applied depending on whether the phone will be an AT&T phone or a T-Mobile phone (e.g., as determined by the MCC and MNC keys).

Example 8

Methods for Configuring Multivariant Mobile Operating Systems

In any of the examples herein, methods can be provided for configuring multivariant mobile operating systems. For example, dynamic configuration of a multivariant mobile operating system can be performed by determining keys indicating configuration parameters of a mobile computing device, configuration settings can be retrieved and prioritized, and the prioritized configuration settings can be applied to the multivariant mobile operating system. For example, the methods described herein can be used to configure a multivariant mobile operating system running on a mobile phone to use one of a number of possible combinations of mobile operator, country, region, hardware and/or software configuration options, etc.

Figure 4:
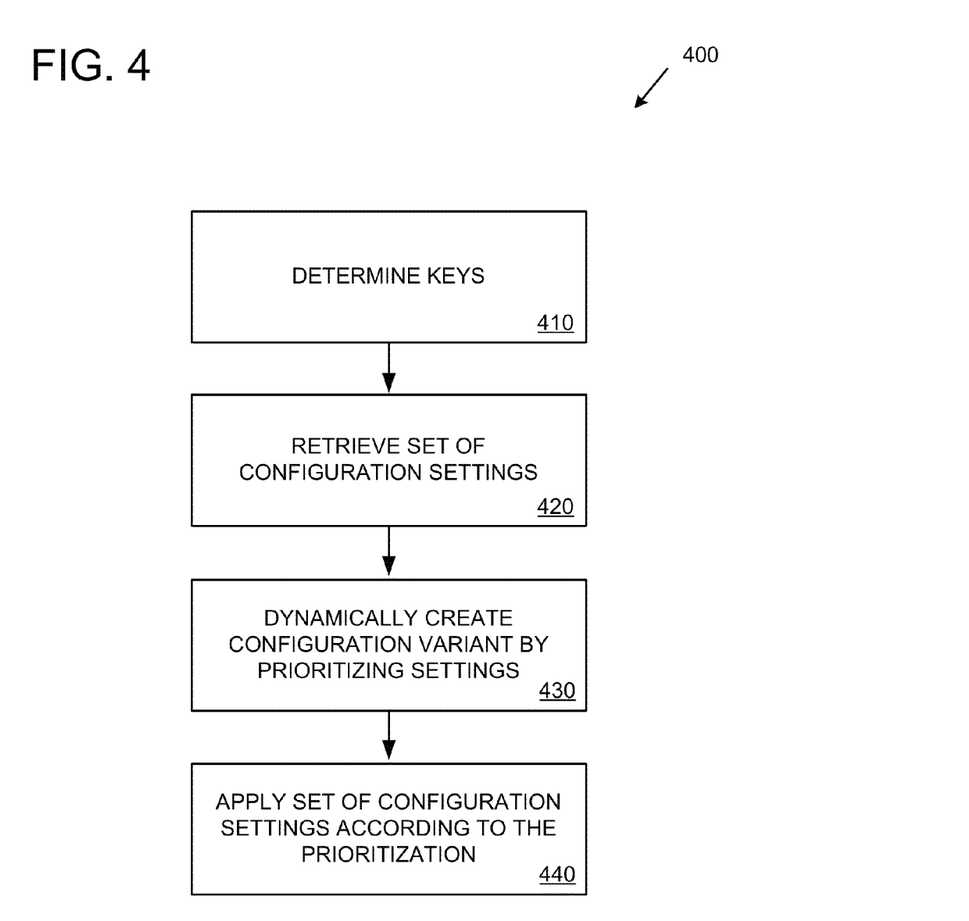
FIG. 4 is a flowchart of an example method for dynamic application of variant settings to a multivariant mobile operating system.

FIG. 4 is a flowchart of an example method 400 for dynamic application of variant settings to a multivariant mobile operating system running on a mobile computing device. At 410, a plurality of keys are determined that indicate configuration parameters of the mobile computing device (e.g., UICC keys and/or extension keys).

At 420, a set of configuration settings are retrieved. The set of configuration settings can be retrieved from a settings data store located on the mobile computing device. The set of configuration settings can be retrieved by matching the keys (determined at 410) with entries in one or more data repositories of the settings data store.

At 430, a configuration variant is dynamically created by prioritizing the retrieved set of configuration settings. In some implementations, the configuration variant is created by ordering the configuration settings, at least in part, from least specific to most specific. Ordering can also be performed based on specific keys, groups of keys, the order that configuration settings were stored in a particular data repository, and/or which data repository the configuration settings were retrieved from, etc. In other implementations, the configuration variant is created by determining the highest priority settings for any overlapping settings, which can include removing any settings that would be overwritten by higher priority settings.

At 440, the set of configuration settings are applied to the multivariant mobile operating system according to the prioritization. For example, the configuration settings can be applied from lowest priority to highest priority (e.g., from least specific to most specific). As another example, the configuration variant can be applied to configure the multivariant mobile operating system (e.g., by applying a consolidated set of configuration settings where only the highest priority settings for any overlapping settings are present).

Figure 5:
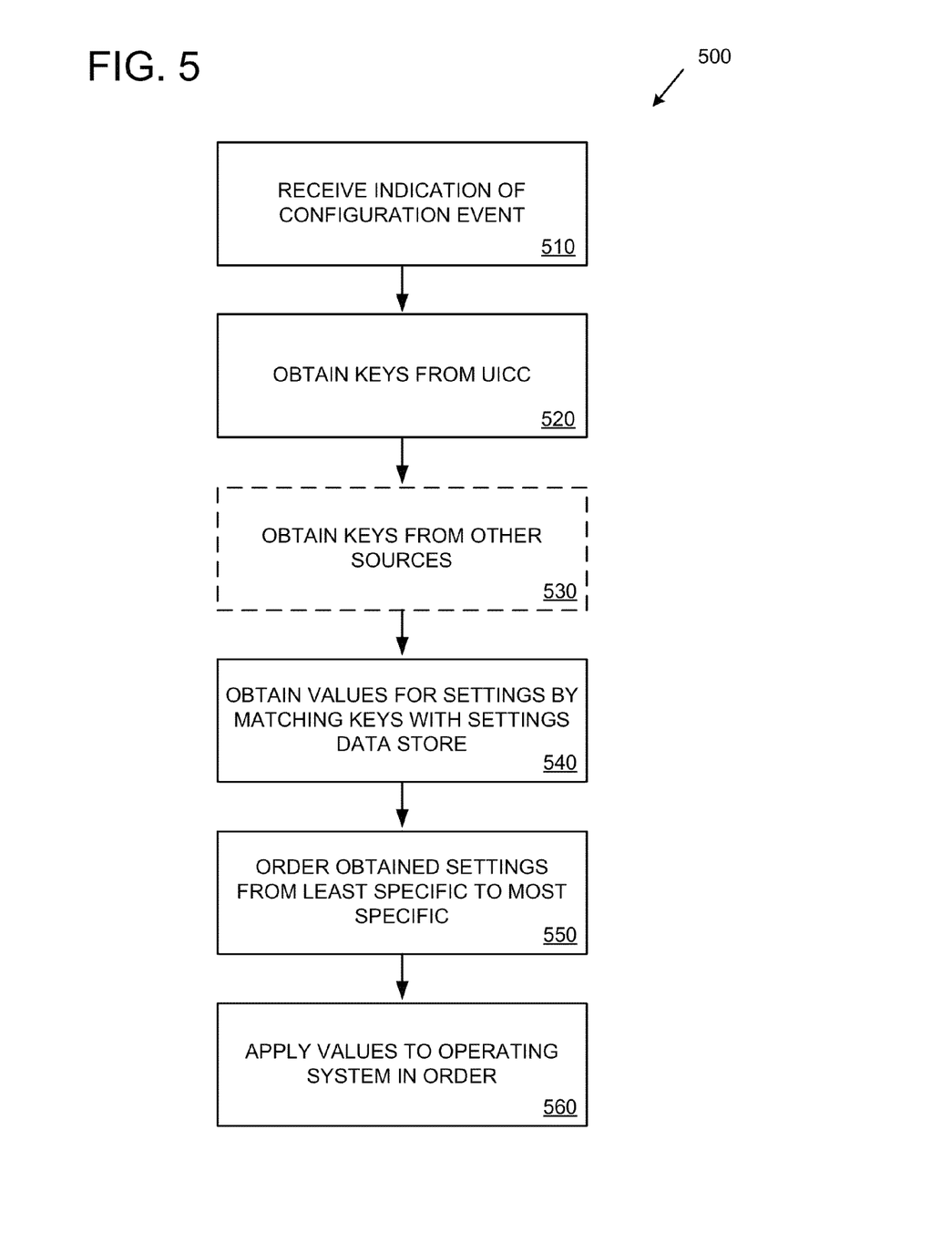
FIG. 5 is a flowchart of an example method for dynamic application of variant settings to a multivariant mobile operating system.

FIG. 5 is a flowchart of an example method 500 for dynamic application of variant settings to a multivariant mobile operating system running on a mobile computing device. At 510, an indication of a configuration event is received. The configuration event can be, for example, a cold boot, booting from a powered-off state, a reboot, detection of a new UICC card, etc.

At 520, a plurality of UICC keys are determined that indicate configuration parameters of the mobile computing device. For example, keys such as MNC, MCC, SPN, and language preference can be determined. In some implementations, keys can be obtained from other sources at 530.

At 540, a set of configuration settings are obtained by matching the keys with configuration settings stored in a settings data store.

At 550, the obtained configuration settings are ordered, at least in part, from least specific to most specific.

At 560, the configuration settings are applied to the multivariant mobile operating system in the order indicated at 550.

Example 9

Computing Systems

Figure 6:
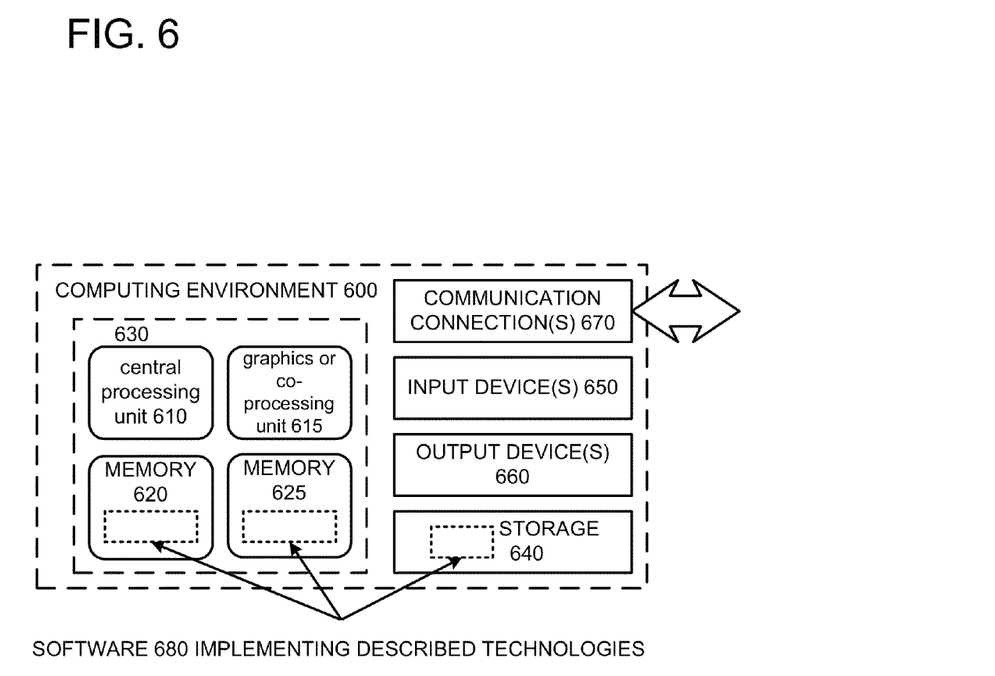
FIG. 6 is a diagram of an exemplary computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10

Mobile Device

Figure 7:
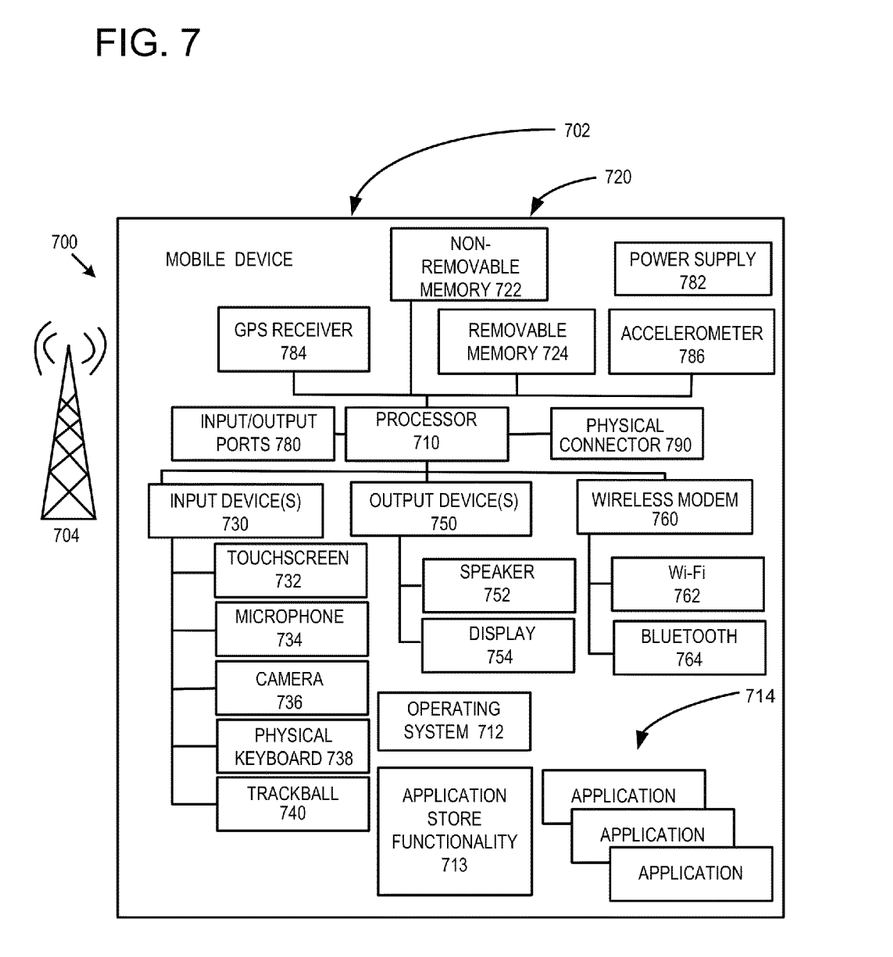
FIG. 7 is an exemplary mobile device that can be used in conjunction with the technologies described herein.

FIG. 7 is a system diagram depicting an exemplary mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Universal Integrated Circuit Card (UICC), which is well known in cellular communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Example 11

Cloud-Supported Environment

Figure 8:
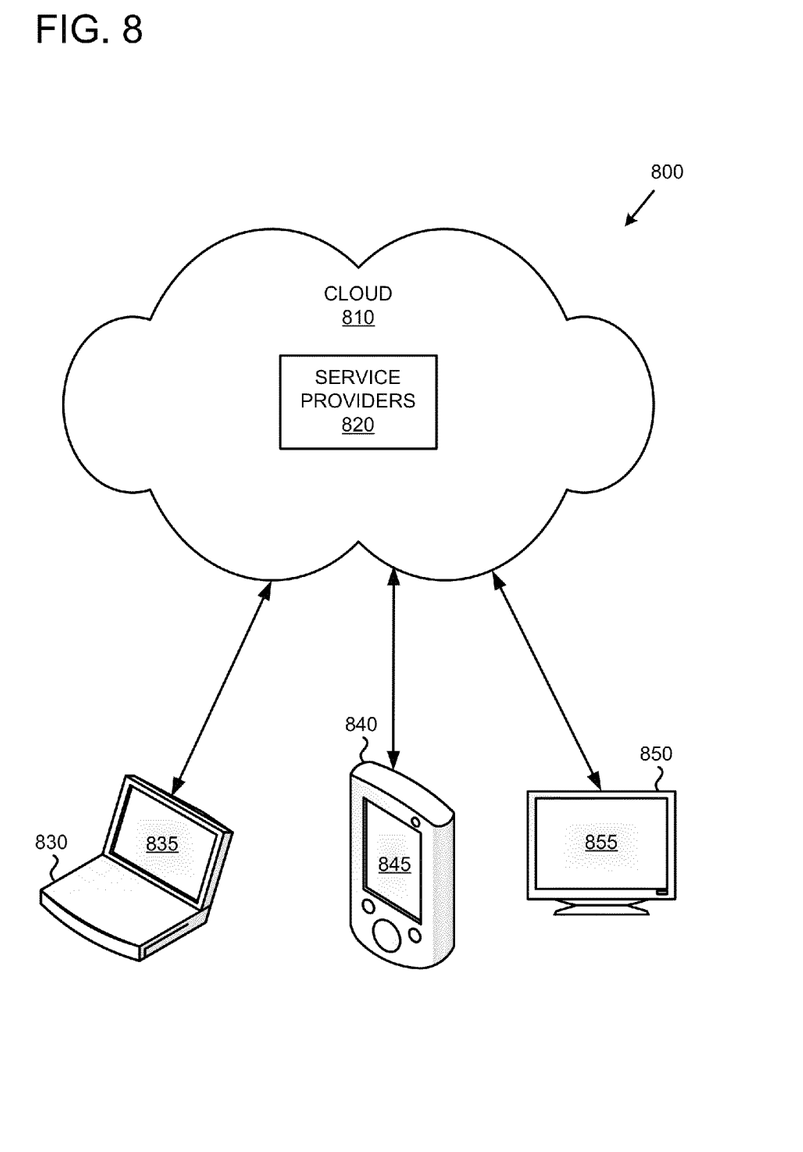
FIG. 8 is an exemplary cloud-support environment that can be used in conjunction with the technologies described herein.

FIG. 8 illustrates a generalized example of a suitable implementation environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example 12

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include signals and carrier waves. In addition, the term computer-readable storage media does not include communication connections (e.g., 670, 760, 762, and 764).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method, implemented at least in part by a mobile computing device, for dynamic application of variant settings to a multivariant mobile operating system, the method comprising:
    determining, by the mobile computing device, a plurality of keys, wherein the plurality of keys indicate, at least in part, configuration parameters for the mobile computing device, and wherein the plurality of keys comprises a key indicating a case color hardware configuration of the mobile computing device;
    retrieving, from a settings data store located on the mobile computing device, a set of configuration settings and corresponding values based on the plurality of keys, wherein the set of configuration settings comprises two instances of a configuration setting, one instance having a first value with a lower priority and the other instance having a second value with a higher priority, and wherein the settings data store stores values for a case color configuration setting;
    dynamically creating a configuration variant by prioritizing, by the mobile computing device, the retrieved set of configuration settings; and
    applying the set of configuration settings to the multivariant mobile operating system according to the prioritization, wherein the mobile computing device runs the multivariant mobile operating system, and wherein applying the set of configuration settings to the multivariant mobile operating system according to the prioritization comprises:
        applying each configuration setting, of the set of configuration settings, in order of priority, from lowest priority to highest priority, including:
            applying the instance of the configuration setting with a lower priority by setting the configuration setting to the first value; and
            after applying the instance with the lower priority, applying the instance of the configuration setting with the higher priority by overwriting the configuration setting to the second value.

2. The method of claim 1 wherein the plurality of keys comprise:
    a key indicating a country; and
    a key indicating mobile network.

3. The method of claim 1 wherein the plurality of keys comprise:
    a mobile country code key;
    a mobile network code key; and
    a service provider name key.

4. The method of claim 1 wherein determining the plurality of keys comprises:
    determining available keys associated with a Universal Integrated Circuit Card (UICC) of the mobile computing device;
    wherein at least one of the plurality of keys is selected from the available keys of the UICC.

5. The method of claim 4 wherein determining the plurality of keys further comprises:
    determining available keys indicating hardware and/or software configuration of the mobile computing device;
    wherein at least one of the plurality of keys is selected from the available keys indicating hardware and/or software configuration of the mobile computing device.

6. The method of claim 1 wherein the settings data store stores values for:
    a plurality of different countries;
    a plurality of different mobile operators; and
    a plurality of different hardware and/or software configurations of the mobile computing device.

7. The method of claim 1 wherein dynamically creating the configuration variant by prioritizing the retrieved set of configuration settings comprises:
    consolidating the retrieved set of configuration settings to remove lower priority settings that would be overwritten by higher priority settings.

8. The method of claim 1 wherein applying the set of configuration settings to the multivariant mobile operating system according to the prioritization comprises:
    applying each configuration setting, of the set of configuration settings, in order of priority, including:
        applying, at least in part, the set of configuration settings from lowest priority to highest priority; and
        applying, at least in part, the configuration settings from least specific to most specific.

9. A mobile computing device running a multivariant mobile operating system, the mobile computing device comprising:
    a processing unit;
    memory;
    a Universal Integrated Circuit Card (UICC);
    a settings data store; and
    a runtime engine, the runtime engine configured to perform operations comprising:
        determining a plurality of keys, wherein the plurality of keys indicate, at least in part, configuration parameters for the mobile computing device, and wherein the plurality of keys comprises a key indicating a case color hardware configuration of the mobile computing device;
        retrieving, from the settings data store, a set of configuration settings and corresponding values based on the plurality of keys, wherein the set of configuration settings comprises two instances of a configuration setting, one instance having a first value with a lower priority and the other instance having a second value with a higher priority, and wherein the settings data store stores values for a case color configuration setting;
        dynamically creating a configuration variant by prioritizing the retrieved set of configuration settings, wherein prioritizing the retrieved set of configuration settings comprises ordering the set of configuration settings from lowest priority to highest priority; and
        applying the set of configuration settings to the multivariant mobile operating system in order from lowest priority to highest priority, wherein applying the set of configuration settings to the multivariant mobile operating system in order comprises:
            applying each configuration setting, of the set of configuration settings, in order of priority, from lowest priority to highest priority, including:
                applying the instance of the configuration setting with a lower priority by setting the configuration setting to the first value; and
                after applying the instance with the lower priority, applying the instance of the configuration setting with the higher priority by overwriting the configuration setting to the second value.

10. The computing device of claim 9 wherein the plurality of keys comprise:
    a mobile country code key stored on the UICC;
    a mobile network code key stored on the UICC; and
    a service provider name key stored on the UICC.

11. The computing device of claim 9 wherein the plurality of keys comprise at least one of:
   a key, not stored on the UICC, that represents a hardware configuration parameter of the mobile computing device; and
   a key, not stored on the UICC, that represents a software configuration parameter of the mobile computing device.

12. The computing device of claim 9 wherein the settings data store stores values for:
   a plurality of different countries;
   a plurality of different mobile operators; and
   a plurality of different hardware and/or software configuration parameters of the mobile computing device.

13. The computing device of claim 9 wherein lower priority settings represent less specific settings, and wherein higher priority settings represent more specific settings.

14. A computer-readable storage medium storing computer-executable instructions for causing a mobile computing device to perform a method for dynamic application of variant settings to a multivariant mobile operating system, the method comprising:
   determining a plurality of keys, wherein the plurality of keys indicate, at least in part, configuration parameters for the mobile computing device, and wherein the plurality of keys comprises a key indicating a case color hardware configuration of the mobile computing device;
   retrieving, from a settings data store, a set of configuration settings and corresponding values based on the plurality of keys, wherein the set of configuration settings comprises two instances of a configuration setting, one instance having a first value with a lower priority and the other instance having a second value with a higher priority, and wherein the settings data store stores values for a case color configuration setting;
   dynamically creating a configuration variant based on priority of the retrieved set of configuration settings, wherein dynamically creating the configuration variant based on priority of the retrieved set of configuration settings comprises:
      consolidating the retrieved set of configuration settings to retain a highest priority setting for any overlapping settings, comprising:
         determining that the two instances of the configuration setting are overlapping;
         in response to determining that the two instances of the configuration setting are overlapping, removing the instance of the configuration setting having the first value with the lower priority from the configuration variant, and retaining the instance of the configuration setting having the second value with the higher priority in the configuration variant; and
      applying the configuration variant to configure the multivariant mobile operating system, wherein the mobile computing device runs the multivariant mobile operating system.

15. The computer-readable storage medium of claim 14 wherein the plurality of keys comprise:
   a mobile country code key;
   a mobile network code key; and
   a service provider name key.

16. The computer-readable storage medium of claim 14 wherein determining the plurality of keys comprises:
   determining available keys associated with a Universal Integrated Circuit Card (UICC) of the mobile computing device;
   wherein at least one of the plurality of keys is selected from the available keys of the UICC.

17. The computer-readable storage medium of claim 14 wherein determining the plurality of keys further comprises:
   determining available keys indicating hardware and/or software configuration of the mobile computing device;
   wherein at least one of the plurality of keys is selected from the available keys indicating hardware and/or software configuration of the mobile computing device.

* * * * *